Figure 1:
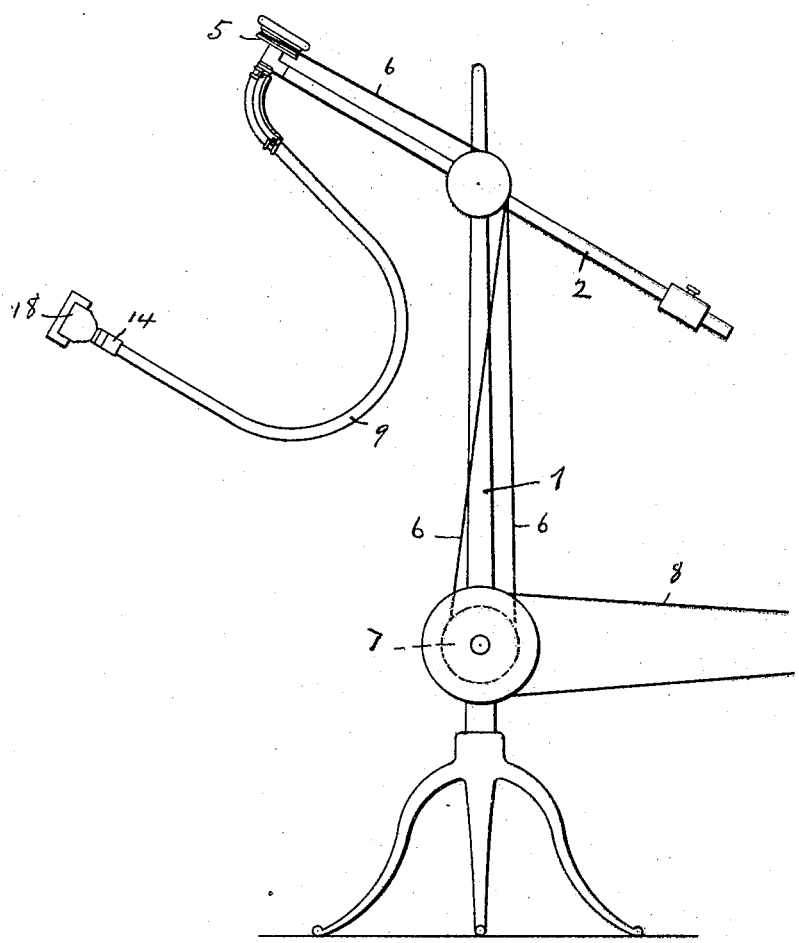

No. 764,917. PATENTED JULY 12, 1904.
G. H. COATES.
FLEXIBLE SHAFT.
APPLICATION FILED JULY 11, 1900.
NO MODEL. 2 SHEETS—SHEET 1.

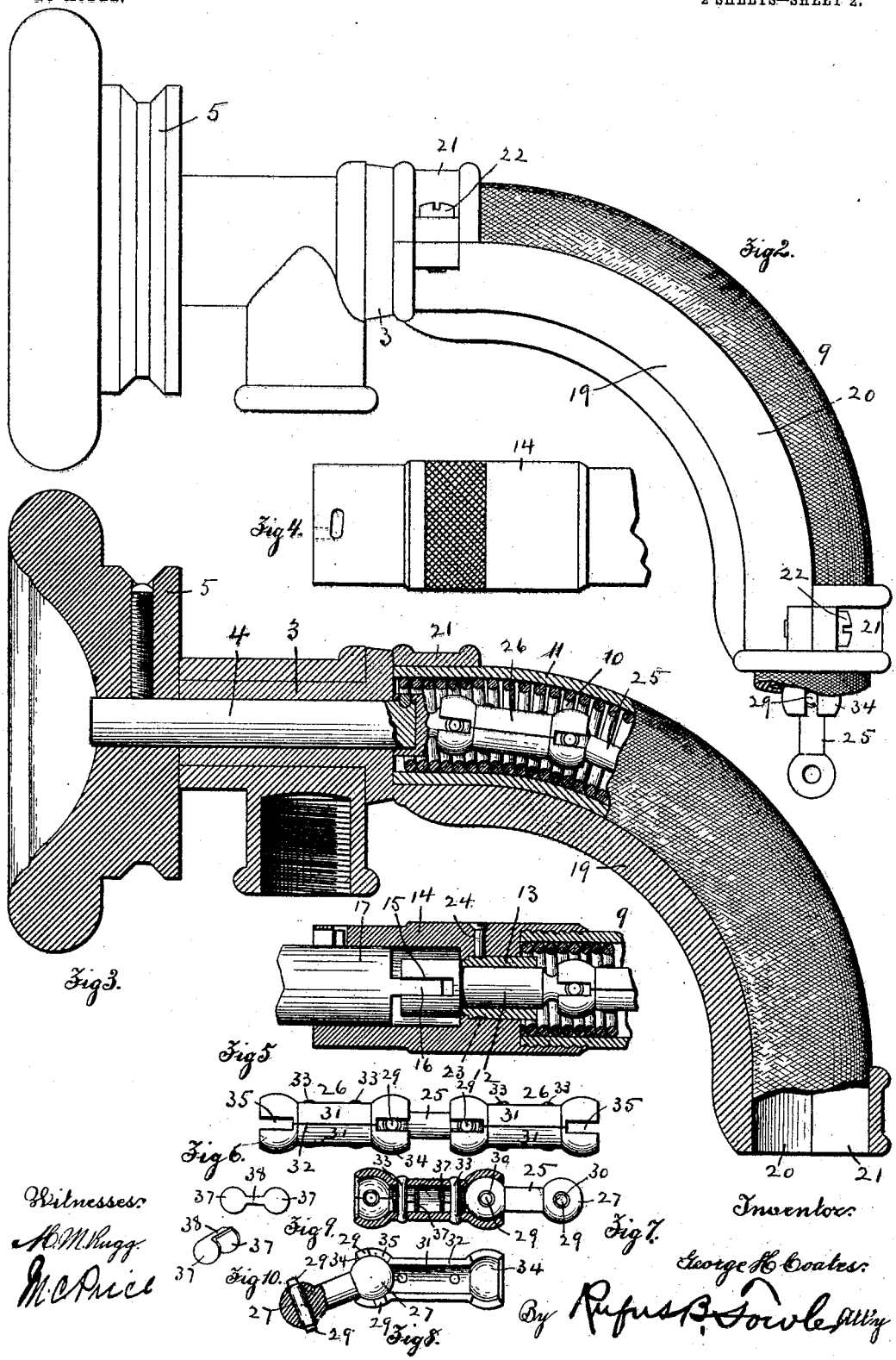

No. 764,917. Patented July 12, 1904.

UNITED STATES PATENT OFFICE.

GEORGE H. COATES, OF WORCESTER, MASSACHUSETTS.

FLEXIBLE SHAFT.

SPECIFICATION forming part of Letters Patent No. 764,917, dated July 12, 1904.

Application filed July 11, 1900. Serial No. 23,194. (No model.)

*To all whom it may concern:*

Be it known that I, GEORGE H. COATES, a citizen of the United States, and a resident of Worcester, in the county of Worcester and Commonwealth of Massachusetts, have invented certain new and useful Improvements in Flexible Shafts, of which the following is a specification, reference being made to the accompanying drawings, forming a part of the same, in which—

Figure 1 represents a side view of a driving mechanism as applied to a hair-clipping machine and comprising a flexible shaft embodying my invention. Fig. 2 is a side view of the driving end of the flexible shaft. Fig. 3 is a central sectional view of the driving end of the shaft, as shown in full in Fig. 2. Fig. 4 represents the driven end of the flexible shaft. Fig. 5 is a central sectional view of the driven end of the flexible shaft. Fig. 6 represents three detached links of the driving portion of the flexible shaft. Fig. 7 represents two links of the driving portion of the flexible shaft, one of said links being shown in central sectional view. Fig. 8 represents two links of the driving portion of the flexible shaft, one of said links being shown in sectional view on a plane at right angles to the section shown in Fig. 7. Fig. 9 represents a sheet-metal blank consisting of two circular disks adapted to fit the tubular links of the driving portion of the shaft, said disks being connected by a neck which is bent at right angles to form an interior brace for the tubular links; and Fig. 10 represents the interior brace for the tubular links formed from the blank shown in Fig. 9.

Similar reference-numerals refer to similar parts in the different views.

My invention has for its object to simplify the construction and increase the efficiency of a flexible shaft adapted for those purposes for transmitting power for which flexible shafts are now commonly used; and it consists in the construction and arrangement of parts as hereinafter described, and pointed out in the annexed claims.

In the accompanying drawings, Figure 1 represents a flexible shaft embodying my invention, forming a part of a driving mechanism for actuating a hair-clipping machine such as is now in common use in clipping horses.

1 denotes a supporting-stand, upon which a counterbalanced rod 2 is pivoted and carrying upon one end a bearing or sleeve 3, in which is journaled a spindle 4, having a belt-pulley 5 attached to one end and driven by a belt connection 6 from a driving-pulley 7, journaled at the base of the stand 1 and driven by a belt connection 8 from any suitable motor.

The flexible shaft comprises an outer sheath 9, consisting, preferably, as in shafts now in common use, of a closely-wound coil of wire 10, provided with a woven-canvas covering 11 and containing a series of links connected with the rotating spindle 4 and coupled together to form a series of universal joints capable of permitting each link to rotate about its axis when placed at an angle to the axes of its connecting-links, so that the rotation of the spindle 4 will be conveyed through the series of links to a spindle 12 at the driven end of the chain, causing the spindle 12 to be rotated in a bearing or sleeve 13, held from longitudinal movement in an outer sleeve 14, which is secured upon the end of the sheath 9.

The driven spindle is provided with a slot 15 at its end, adapted to receive a tongue 16 upon the end of a spindle 17, forming in the present instance part of the actuating mechanism of a clipping-machine 18. (Shown in Fig. 1.) The sleeve 3, in which the spindle 4 is journaled, is provided with a curved arm 19, preferably comprising one-quarter of a circle and consisting of a trough 20, adapted to receive the circular sheath 9 and having caps 21 21, inclosing the sheath 9 and attached to the ends of the trough 20 by screws 22, by which the flexible shaft at its driven end is permanently held in a curved position corresponding to the curvature of the arm 19, by which the direction of the flexible shaft is bent at right angles to the axis of the driving-spindle 4 with a uniform and gradual curve, thereby preventing a short and abrupt bend of the flexible shaft next the driving-spindle 4. The sleeve 13, in which the driven spindle 12 is journaled, is provided with a groove 23 to receive the end of a set-screw 24, and thereby hold the sleeve 13 from longitudinal movement. The driven spindle 12 is capable of a slight longitudinal movement in the sleeve 13 to provide for a slight expansion and contraction in the length of the rotating portion of the flexible shaft.

The rotating portion of the flexible shaft connecting the driving-spindle 4 and the driven spindle 12 consists of a series of links 25 and 26. Each of the links 25 consists of short bars provided with spherical ends 27, carrying parallel pins at right angles with the axis of the link and projecting from the sides of the spherical ends, forming gudgeons 29 29, which are reduced in diameter, forming shoulders 30 30. Each of the links 26 consists of a shell formed of two similar halves 31 31, having parallel abutting edges 32 and being held together by rivets 33. Each end of the links 26 is enlarged at 34 and adapted to inclose a little more than half the periphery of the spherical ends 27, forming a ball-and-socket joint.

The enlarged ends 34 are provided on opposite sides with a short slot 35 of sufficient width to receive the gudgeons 29, with the edges of the slots 35 overlapping the shoulders 30. Each of the links 25 is capable of rocking on the gudgeons 29 in a plane at right angles to the axes of the gudgeons, and they are also capable of rocking in a plane parallel with the axes of the gudgeons 29 by allowing the gudgeons 29 to slide in the slots 35, as shown in Fig. 8. The links 25 are therefore capable of rotating in two planes at right angles to each other, forming universal joints and allowing the rotation of the driving-spindle 4 to be communicated, through the series of links, to the driven spindle 12, with a limited deflection of each of the joints from the right line. The gudgeons 29 are fitted tightly in the spherical ends 27 of the links 25, and they are also held from longitudinal movement by means of the edges of the slots 35 overlapping the shoulders 30, and the movement of the links 25 within the links 26 in a vertical plane parallel with the gudgeons 29 is limited by the length of the slots 35, so that as the links 25 are turned at an angle with the links 26, as shown in Fig. 8, the gudgeons 29 on opposite sides are held within the slots 35. The flexible shaft described in my present application is an improvement upon the flexible shaft forming the subject of Letters Patent of the United States granted to me March 16, 1897, No. 578,724, the alternate links 25 and 26 of my present shaft accomplishing the same result as those shown in the aforesaid patent, but with a less number of parts.

In order to hold the two halves 31 31 of the links 26 in alinement with each other, I inclose within the tubular links 26 a pair of braces each consisting of the circular disks 37 37, connected by a neck 38, which is bent at right angles, as shown in Fig. 10, in order to maintain the disks 37 transversely to the bore of the tubular links, and the braces are inserted within the links so as to bring the rivets 33 between the circular disks 37. The braces are formed from a sheet-metal blank, (represented in Fig. 9,) and their position within the tubular links is shown in Fig. 7. The parallel abutting edges 32 are plane surfaces, and they are held from sliding laterally upon each other by means of the circular disks 37, which fit the bore in each half of the tubular link.

What I claim as my invention, and desire to secure by Letters Patent, is—

1. A flexible shaft comprising two forms of links, one form of link having spherical ends and the other spherical sockets fitted thereto and having slots, the spherical ends having holes passing entirely through them and pins fitted loosely in these holes with their ends in the form of gudgeons which have sliding connection in the slots in the sockets.

2. A flexible shaft comprising two forms of links, one form of link having spherical ends and the other spherical sockets fitted thereto and having slots, the spherical ends having holes passing entirely through them, and pins fitted loosely in these holes and capable of turning therein, with their ends in the form of gudgeons which have sliding connection in the slots in the sockets.

3. In a flexible shaft, the combination with a driving-spindle and a flexible section connected at one end to said driving-spindle, of a driven spindle connected to the opposite end of said flexible shaft, a sleeve forming a bearing for said driven spindle, said sleeve having an external groove, an outer sleeve inclosing said bearing-sleeve and means extending from the outer sleeve into the groove for holding said bearing-sleeve from longitudinal movement in said outer sleeve, substantially as described.

4. A flexible shaft comprising two forms of links, one form of link having spherical ends and the other spherical sockets fitted thereto and having slots, the spherical ends having holes passing entirely through them and pins fitted loosely in these holes with their ends in the form of gudgeons which have sliding connection in the slots in the sockets, and shoulders formed between the gudgeons and body of the pin.

5. In a flexible shaft, the links 26, comprising the halves 31, 31, rivets uniting said halves and interior skeleton braces by which said halves are held from lateral displacement, substantially as described.

6. In a flexible shaft, the flexible section comprising a series of tubular links having enlarged ends provided on their opposite sides with open slots and an alternating series of links provided with spherical ends held in the enlarged ends of said tubular links and carrying pins held in the spherical ends with their ends projecting beyond the spherical ends of the links and forming gudgeons held in the slots of said tubular links, said pins having shoulders engaged by said slots, whereby said pins are held from displacement substantially as described.

Dated this 9th day of July, 1900.

GEORGE H. COATES.

Witnesses:
RUFUS B. FOWLER,
M. C. PRICE.